United States Patent [19]

Bond et al.

[11] 4,187,549
[45] Feb. 5, 1980

[54] DOUBLE PRECISION RESIDUE COMBINERS/CODERS

[75] Inventors: James W. Bond; Gary A. Dressel, both of San Diego, Calif.

[73] Assignee: The United States of America as represented by the Secretary of the Navy, Washington, D.C.

[21] Appl. No.: 939,642

[22] Filed: Sep. 5, 1978

[51] Int. Cl.² .............................................. G06F 7/48
[52] U.S. Cl. .................................................. 364/746
[58] Field of Search ........................................ 364/746

[56] References Cited

U.S. PATENT DOCUMENTS

| 3,980,874 | 9/1976 | | 364/746 |
|---|---|---|---|
| 4,107,783 | 8/1978 | Huang | 364/746 |

OTHER PUBLICATIONS

Liv et al. "Residue Generator of Binary Numbers in 2's Complement Form" IBM *Technical Disclosure Bulletin* vol. 9, No. 2, Jul. 1966, pp. 158-159.

Banerji "A Novel Implementation Method for Addition & Subtraction in Residue Number Systems" *IEEE Trans. on Computers*, Jan. 1974, pp. 106-109.

*Primary Examiner*—David H. Malzahn
*Attorney, Agent, or Firm*—Richard S. Sciascia; Ervin F. Johnston; John Stan

[57] ABSTRACT

Apparatus, useful in signal processing, and which can be used for modulo ($2^n - 1$) addition, subtraction, coding, and decoding, has a plurality of 2n input means: n means for receiving a signal $I_0, I_1, \ldots, I_{n-1}$, and another n means for receiving a signal $J_0, J_1, \ldots, J_{n-1}$. A pluraity n of means, connected to the n I signal input means, may switch each input means so that it is connected alternately into one of two connecting points, a first and a second connecting point. A plurality n of means is connected to the n first connecting points, for inverting the polarity of a signal received at its input, the output of the inverting means being connected to its associated second connecting point. A plurality n of three input adding means, has one input connected to the output of the inverting means, and another being connected to an associated means for receiving a J signal, the means adding the two inputs. The plurality n of adding means are circularly connected to each other, by a third input in the manner of a full adder. Means, having its n inputs connected to the n adding means, add the n-inputs in an AND manner. A second means, whose input is connected to the output of the n-input adding means, inverts the signal at its input.

A plurality of two-input means has one of its inputs connected to the output of one of the plurality of n adding means, the other input being connected to the output of the second-named inverting means, the output being the required decoded signal.

3 Claims, 7 Drawing Figures

MODULO ($2^n-1$) ADDER, SUBTRACTER, CODER, AND COMBINER (DECODER).

FIG. 1. MODULO $(2^n-1)$ ADDER, SUBTRACTER, CODER, AND COMBINER (DECODER).

FIG. 2. OPERATIONAL CONFIGURATIONS FOR DEVICE SHOWN IN FIG. 1.

FIG. 3.
PRIOR ART
PARALLEL n-BIT BINARY ADDER

FIG. 4.
DEVICE USING SINGLE PARALLEL ADDER.

FIG. 5. DEVICE WITH CASCADED PARALLEL ADDERS.

FIG. 6. RESIDUE ARITHMETIC: COMBINER/CODER.

FIG. 7. COMBINER/CODER WITH GREATER CAPACITY THAN THAT SHOWN IN FIG. 6.

DOUBLE PRECISION RESIDUE COMBINERS/CODERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a single modular component which can be used to:

(1) Add modulo $(2^n - 1)$ (2) Subtract modulo $(2^n - 1)$ (3) Code a 2n−bit integer into its least positive residue modulo $(2^n - 1)$ (4) Combine the residue of an integer modulo $2^n$ and an integer modulo $(2^n - 1)$ to obtain the n most significant bits of the integer modulo $2^n(2^n - 1)$. The n−least significant bits are the same as the integer modulo $(2^n)$ input. The invention when used in conjunction with residue multipliers, correlators, convolvers, transversal filters, microprocessors, one for modulos $2^n$ and one for modulo $(2^n - 1)$, allows a simple double-precision module to be constructed.

The mathematical basis for combining the results for different moduli which are pairwise relatively prime has been known for nearly a thousand years, and is called the Chinese Remainder Theorem. The Chinese Remainder Theorem is a simple formula for the remainder obtained by dividing a number by a composite number (i.e. a number $m = m_1 m_2$ with $M_1$ and $m_2$ both greater than one) in terms of the remainders obtained by dividing the number by each of the factors of the composite number m (i.e. $m_1$ and $m_2$).

Additional information on this theorem, as well as general information on residue class arithmetic, may be obtained from U.S. Pat. No. 4,041,284 by James W. Bond, entitled SIGNAL PROCESSING DEVICES USING RESIDUE CLASS ARITHMETIC, which issued on 19 Aug. 1977. However, simple digital implementations of the Chinese Remainder Theorem in terms of shifts and adds of the input data have not been known. Instead the standard approach has been to combine the inputs to obtain an intermediate representation of the answer in a form known as the mixedradix representation. This is described by Szabo, N.S. & Tanaka, R.I., *Residue Arithmetic and Its Applications to Computer Arithemtic*, McGraw Hill 1967.

The limitation of this prior art approach is the complexity of the logic required and the limited speed the logic can be used to combine inputs. The inventions described are simpler and faster than previously known approaches to implementing the Chinese Remainder Theorem for the use of the moduli $2^n$ and $(2^n - 1)$.

Addition and subtraction modulo $2^n$ is simple. Addition is accomplished by using ordinary binary n-bit adders and ignoring the carry bit. Subtraction is performed using ordinary binary adders along with inverters. To calculate a-b the following is done:

(a) Inverters are used to form $(2^n - 1) - b$, the bit by bit complement of the binary number b.

(b) An ordinary binary adder with carry input is used to calculate $a + ((2^n - 1) + 1)$. If the carry-out is ignored, the output is congruent to a-b modulo $2^n$. Thus all modulo $2^n$ additions and subtractions can be accomplished using readily available digital components. The inventions described provide a simple means for accomplishing the coding, combining (or decoding), necessary for doing double precision calculations via the moduli $2^n$ and $2^n - 1$.

SUMMARY OF THE INVENTION

An apparatus for a modulo number calculation of input signals in binary form, using residue class arithmetic, comprises a plurality n of three-input, two-output, adding means. One input is for receiving a signal $K_0$, $K_1, \ldots ; K_{n-1}$, a second input receives a signal, $J_0, J_1, \ldots, J_{n-1}$, while the third input, for receiving an input carry, is circularly connected to one of the outputs of an adjacent adding means, for transmitting an output carry to it. Each $J_i$ and $K_i$ term is either a 1 or a 0. The second output of the 0-th adding means is connected to the third input of the first adding means, the first is connected to the second, etc., through the (n-1)st to the 0-th. An n-input adder, whose inputs comprise, and are connected to, the outputs of the n three-input adders, or full adders, adds the n inputs in an AND manner, that is, it outputs a 1 only if all inputs to it are 1's.

An inverter, whose input is connected to the output of the n-input adder inverts the signal at its input.

A plurality of n two-input adders has one of its inputs connected to the output of one of the n adding means, the other input being connected to the output of the inverter. The output signal comprises the sum (a+b) modulo $(2^n - 1)$ of two input signals, a modulo $(2^n - 1)$ and b modulo $(2^n - 1)$, the apparatus thereby serving as an adder.

OBJECTS OF THE INVENTION

An object of the invention is to provide a single modular component, which utilizes residue class arithmetic, which can add, subtract, and code and decode numbers.

Another object of the invention is to provide such a modular component which has doubled the precision of similar prior art components.

These and other objects of the invention will become more readily apparent from the ensuing specification when taken together with the drawings.

BRIEF DESCRIPTION OF THE DRAWINGS

FIG. 2 is a block diagram showing the operational configurations for the device shown in FIG. 1: FIG. 2A showing the device used as a modulo $(2^n - 1)$ residue adder; FIG. 2B showing the device used as a modulo $(2^n - 1)$ residue subtractor; FIG. 2C showing the device used as a coder; and FIG. 2D showing the device used as a modulo number combiner, or decoder.

DESCRIPTION OF THE PREFERRED EMBODIMENTS

Figure 1:
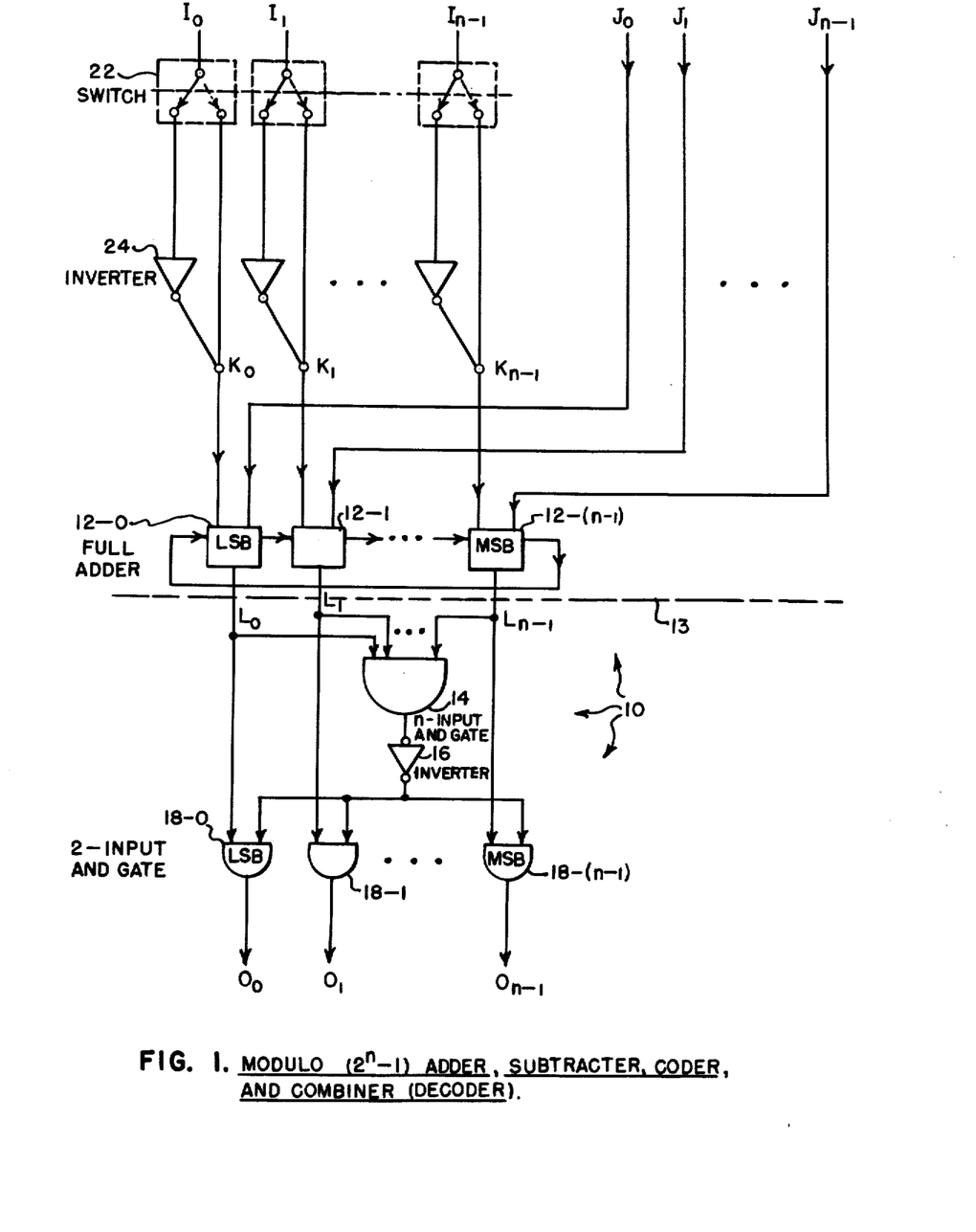
FIG. 1 is a schematic diagram of a modulo number, adder, subtracter, coder and combiner, or decoder.

FIG. 1 shows the structure of the modulo $2^n-1$ adder, subtracter, coder, and combiner (decoder) 10. One novel feature of the combination 10 is that it can perform a multiplicity of modulo arithmetic operations. The inputs have been labeled $I_0, \ldots, I_{n-1}$, and $J_0, \ldots, J_{n-1}$, each being either a 1 or a 0. The outputs have been labeled $O_0, \ldots, O_{n-1}$.

Suppose that the inputs to the full adders, 12-0 through 12-(n−1), corresponded to the binary numbers $$K = \sum_{i=0}^{n-1} K_i 2^i \text{ and } J = \sum_{i=0}^{n-1} J_i 2^i,$$

then the number $$L = \sum_{i=0}^{n-1} L_i 2^i,$$

corresponding to the full adder outputs $L_0, L_1, \ldots, L_{n-1}$ in FIG. 1 is congruent modulo $(2^n-1)$ to $J+K$. If $J+K \leq 2^n-1$, there is no carry out and the desired result is clear. If $J+K > 2^n-1$ there is a carry out. By connecting the carry out from the most significant bit, in full adder 12-(n−1), to the carry in of the least significant bit, in full adder 12-0, the number $((K+J)-2^n)+1$ is formed, so again L is congruent to $(K+J)$ modulo $(2^n-1)$.

If $L < 2^n - 1$ then the n-input AND gate 14 outputs a zero, which is inverted in inverter 16 and inputted to the 2-input AND gates along with $L_0, L_1, \ldots, L_{n-1}$. The outputs $O_i$ therefore equal $L_i$.

If $L = 2^n - 1$, the n-inputs to AND gate 14 are all 1's, and AND gate 14 outputs a one, which is inverted in inverter 14 and inputted to the 2-input AND gates, 18-0 through 18-n. The outputs $O_0, O_1, \ldots, O_{n-1}$ are therefore all zero in this case. Thus, in this instance, the outputs $O_0, O_1, \ldots, O_{n-1}$ can be interpreted as the least positive representative modulo $(2^n-1)$ of the sum of the inputs J and K.

Figure 2:
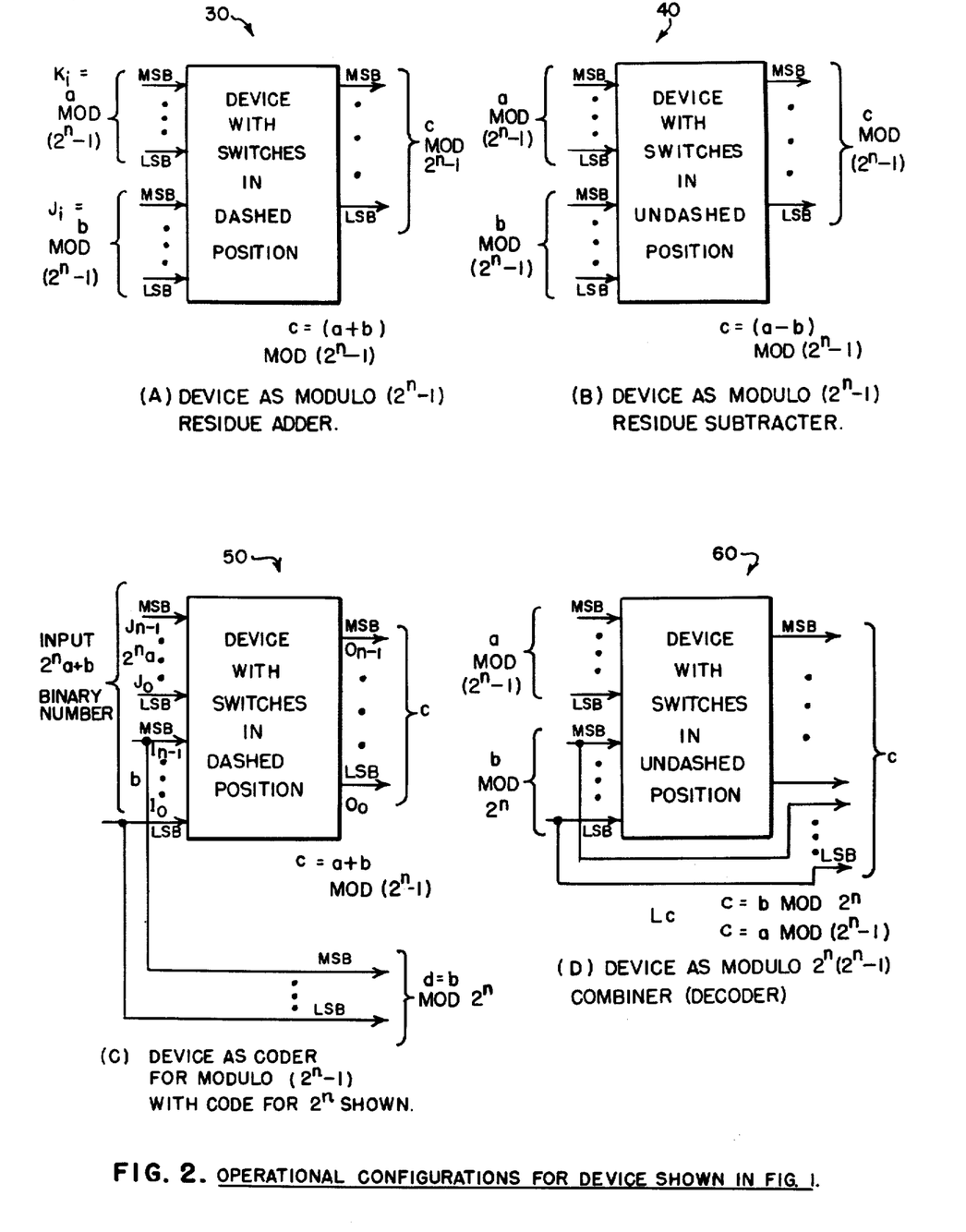

FIG. 2 shows how the device 10 shown in FIG. 1 can be used operationally, for four different functions.

If the switches 22 are in the dashed position, then $I_i = K_i$ and the output of the circuit 10, FIG. 1, can be interpreted as the binary representation of the least positive representative modulo $(2^n-1)$ of the sum of the integers $$\sum_{i=0}^{n-1} I_i 2^i \text{ and } \sum_{i=0}^{n-1} J_i 2^i.$$

This is shown by the adder 30 shown in FIG. 2A.

If the switches 22 are in the undashed position, then $K_i = 1 - I_i$, $i = 0, \ldots, n-1$, and therefore the bits $K_i$ represent the integer $$K = \sum_{i=0}^{n-1} (1 - I_i) 2^i = \sum_{i=0}^{n-1} 2^i - \sum_{i=0}^{n-1} I_i 2^i$$

$$= (2^n - 1) - I.$$

i.e. K is congruent to $-I$ modulo $(2^n-1)$. Therefore in this case the outputs of the circuit 10 of FIG. 1 can be interpreted as the binary representation of the least positive representative modulo $(2^n-1)$ of the integer $J+(-I)$. This is shown by the subtracter 40 shown in FIG. 2B.

It will be noted that in FIGS. 2A and 2B the input numbers and the output numbers are modulo numbers, in fact all are modulo $(2^n-1)$.

However, as is discussed hereinbelow, in FIG. 2C, the input number is a non-modulo number, while the output number is a modulo number. In FIG. 2D the situation is reversed.

If the switches 22 of FIG. 1 are in the dashed position and the inputs are interpreted to correspond to the binary representation of the 2n-bit number $$2^n I + J = 2^n \left( \sum_{i=0}^{n-1} I_i 2^i \right) + \sum_{i=0}^{n-1} J_i 2^i,$$

then modulo $(2^n-1)$ this integer is congruent to $$\sum_{i=0}^{n-1} I_i 2^i + \sum_{i=0}^{n-1} J_i 2^i$$

because $2^n \equiv 1 \mod (2^n-1)$. The circuit 10 outputs can therefore be interpreted as the binary representation of the least positive integer congruent modulo $(2^n-1)$ to $2^n I + J$. More simply stated: The sole function of the circuit below the dashed line 13 is to invert all $L_i$'s when all $L_i$'s are equal to a binary 1, resulting in all $O_i$'s equalling zero. In all other cases, $L_i = O_i$. Thus the circuit codes a 2n-bit number as its least positive residue modulo $(2^n-1)$. (As previously mentioned, the residue modulo $2^n$ is just the least n significant bits of $2^n I + J$.) This is shown by the coder 50 of FIG. 2C.

In FIG. 2C, it will be noted that the input binary number is in the format $2^n a + b$. Therefore, the greatest value of b is determined by the number n of bits available for expressing b. The same number n of bits, in the coder 50 shown, are used with the quantity a. That is, the least significant bit (LSB) used for a is one bit more significant than the most significant bit (MSB) associated with b. If n is 8, then neither a nor b can be greater than $2^8 - 1 = 255$. If it is desired to handle numbers greater than 255, then the bit input capacity of device 30 must be greater than 8.

Reference is now directed to the decoder 60 of FIG. 2D. If $I_0, I_1, \ldots, I_{n-1}$ are interpreted as the binary representation of the integer $$I + \sum_{i=0}^{n-1} I_i 2^i$$

and $J_0, J_1, \ldots, J_{n-1}$ as $$J = \sum_{i=0}^{n-1} J_i 2^i$$

then it is claimed that with the switches in the undashed position $$H = 2^n \sum_{i=0}^{n-1} O_i 2^i + I$$

has the following properties:
 (a) $H \equiv I \mod 2^n$
 (b) $H \equiv J \mod (2^n - 1)$ (c) $0 \leq H \leq 2^n(2^n-1)-1$.

This means that the circuit implements the Chinese Remainder Theorem for the moduli $2^n$ and $2^n-1$ and therefore can be used as a combiner (decoder) 60. It is called a combiner because it combines a and b to obtain c.

To see this, it will be observed that (a) is clearly true and (b) is true because $$O = \sum_{i=0}^{n-1} O_i 2^i < 2^n - 1,$$

and hence
$0 \leq 2^n O + J \leq 2^n(2^n-2)+(2^n-1) = 2^{2n}-2^n-1 = 2^n(2^n-1)-1$. To see (b) it will be observed that $$H = 2^n (\sum_{i=0}^{n-1} O_i 2^i) + I$$

$$\equiv \sum_{i=0}^{n-1} O_i 2^i + I = (O + I) \bmod (2^n - 1)$$

With the switches in the undashed position $O \equiv J + (-I)$ modulo $(2^n - 1)$ and therefore $H \equiv J + (-I) \equiv J \bmod (2^n - 1)$.

Therefore the n most significant bits of the residue modulo $2^n(2^n-1)$ are given by 0 and the n least significant bits by the input I, as is shown by the decoder 60 shown in FIG. 2D.

The circuit shown in FIG. 1 can also be used to calculate the residue sum, difference, code modulo $(2^m - 1)$ and combine (decode) for moduli $2^m$ and $(2^m - 1)$ for $1 \leq m < n$, provided the inputs and outputs are properly interpreted. For these applications either the positions labeled $K_i$ for $i = m, \ldots, n-1$ or those labeled $J_i$ for $i = m, \ldots, n-1$ should all correspond to 1 with the others corresponding to 0. For ease of description, suppose $K_i = 1$ for $i = m, \ldots, n-1$ and $J_i = 0$ for $i = m, \ldots, n-1$. The variable inputs are then $I_0, \ldots, I_{m-1}$ and $J_0, \ldots, J_{m-1}$. Now let $$K = \sum_{i=0}^{n-1} K_i 2^i \text{ and } J = \sum_{i=0}^{n-1} J_i 2^i.$$

Then $$K + J = \sum_{i=0}^{n-1} K_i 2^i + \sum_{i=0}^{n-1} J_i 2^i$$

$$= \sum_{i=0}^{m-1} K_i 2^i + \sum_{i=m}^{n-1} 2^i + \sum_{i=0}^{m-1} J_i 2^i.$$

If $K + J \leq 2^n - 1$ then the outputs $L_0, \ldots, L_{m-i}$ are the binary representation of $$\sum_{i=0}^{m-1} K_i 2^i + \sum_{i=0}^{m-1} J_i 2^i.$$

If $K + J > 2^n - 1$ then overflow occurs and $$\sum_{i=0}^{n-1} L_i 2^i = (K + J) - 2^n) + 1$$

$$= \sum_{i=0}^{m-1} K_i 2^i + \sum_{i=0}^{m-1} J_i 2^i + \sum_{i=0}^{m-1} J_i 2^i - \sum_{i=0}^{m-1} 2^i$$

$$= \sum_{i=0}^{m-1} K_i 2^i + \sum_{i=0}^{m-1} J_i 2^i - (2^m - 1).$$

(These calculations use the identity $$\sum_{i=0}^{k-1} 2^i = 2^k - 1$$

for any integer $k \geq 1$.)

Because $$\sum_{i=0}^{m-1} K_i 2^i + \sum_{i=0}^{m-1} J_i 2^i$$

can be at most $2(2^m - 1)$, the integer $$\sum_{i=0}^{n-1} L_i 2^i$$

can be at most $2^m - 1$, i.e., $$\sum_{i=0}^{n-1} L_i 2^i = \sum_{i=0}^{m-1} L_i 2^i.$$

Thus the integer $$\sum_{i=0}^{m-1} L_i 2^i$$

is always congruent to $$\sum_{i=0}^{m-1} K_i 2^i + \sum_{i=0}^{m-1} J_i 2^i$$

modulo $(2^m - 1)$. It will be noted that $$\sum_{i=0}^{n-1} K_i 2^i + \sum_{i=0}^{n-1} J_i 2^i = 2^n - 1 \quad (*)$$

if and only if $$\sum_{i=0}^{m-1} K_i 2^i + \sum_{i=0}^{m-1} J_i 2^i = 2^m - 1$$

and therefore the n-input AND gate outputs a 1 if and only if (*) holds. Therefore the outputs $0_0, \ldots, 0 = K_o, \ldots, K_{m-1}$ unless (*) holds and when (*) holds $0_o = 0, \ldots, 0_{m-1} = 0$, i.e.

$$\sum_{i=0}^{n-1} O_i 2^i$$

is the least positive representative modulo $(2^m - 1)$ of the $$\sum_{i=0}^{m-1} K_i 2^i = \sum_{i=0}^{m-1} J_i 2^i.$$

Now it is easy to verify that the devices 30, 40, 50 and 60, as shown in FIG. 2, can also be used to perform m-bit calculations. If the switches 22 are in the undashed position, the outputs of the device 10 in FIG. 1 give the m-bit of the least positive representative modulo $(2^m - 1)$ of the inputs I and J.

If the first m switches are in the undashed position, $K_i = i - I_i$, $i = 0, 1, \ldots, m-1$ and thus $$\sum_{i=0}^{m-1} K_i 2^i = \sum_{i=0}^{m-1} 2^i + - \sum_{i=0}^{m-1} I_i 2^i =$$

$(2^m - 1) + (I)$ so that $K \equiv -J \mod (2^m - 1)$, and in this case the outputs of the device in FIG. 1 correspond to $J - I$ modulo $(2^m - 1)$. The device 10 can be used as a coder with the switches in the dashed position, since the 2m bit number $$2m \sum_{i=0}^{m-1} I_i 2^i + \sum_{i=0}^{m-1} J_i 2^i \equiv I + J \equiv \sum_{i=0}^{m-1} I_i 2^i + \sum_{i=0}^{m-1} J_i 2^i$$

modulo $(2^m - 1)$, and it has been shown that the output is the least positive representative of this sum modulo $(2^m - 1)$.

If the first m switches are in the undashed position then the integer $H = 2^m$ $$\sum_{i=0}^{m-1} O_i 2^i + \sum_{i=0}^{m-1} I_i 2^i$$

has the properties:
 (a) $H \equiv I \mod 2^m$
 (b) $H \equiv J \mod (2^m - 1)$
 (c) $0 \leq H \leq 2m(2^m - 1) - 1$ That (a) holds is clear.
To see (b), observe that $$H = \sum_{i=0}^{m-1} O_i 2^i + \sum_{i=0}^{m-1} I_i 2^i = J + (-I) + I \equiv J \mod (2^m - 1).$$

To see (c), observe that $$0 \leq \sum_{i=0}^{m-1} O_i 2^i \leq 2^m - 2,$$

because it has been shown to be a least positive representative modulo $(2^m - 1)$, and hence $0 \leq H \leq 2^m(2^m - 2) + (2^m - 1) = 2^m(2^m - 1) - 1$.

Figure 3:
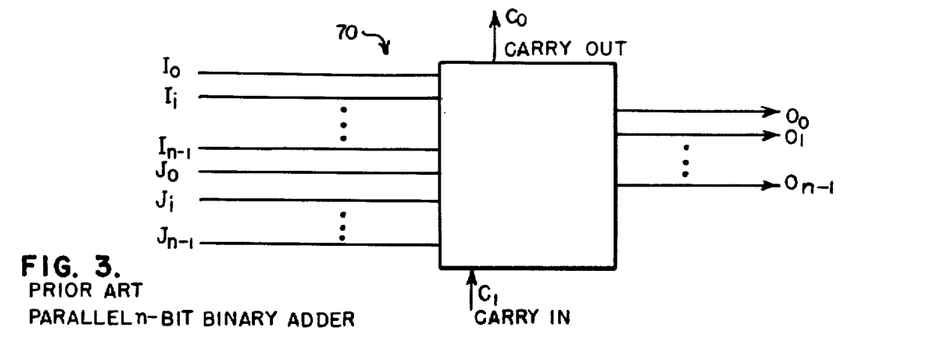
FIG. 3 is a block diagram of a prior art parallel n-bit binary adder.

The circuit 10 shown in FIG. 1 can be implemented by using directly or connecting parallel digital adders 70 of the form shown in FIG. 3. The circuit can be implemented on a special chirp or can be fabricated from available digital adders.

The adder 70 in FIG. 3 can be characterized by the identity:

$$C_1 + \sum_{i=0}^{n-1} I_i 2^i + \sum_{i=0}^{n-1} J_i 2^i = \sum_{i=0}^{n-1} O_i 2^i + C 2^n$$

with C, $C_1$ and the $I_i$, $J_i$ all either 0 or 1.

Figure 4:
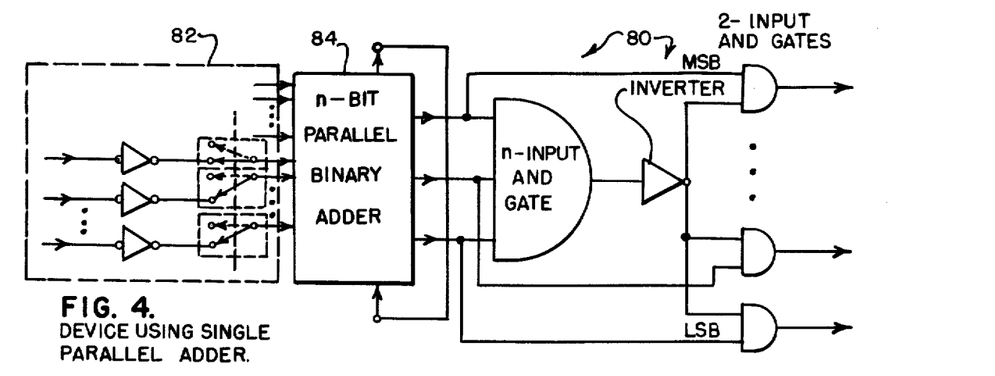
FIG. 4 is a block diagram of a device using a single parallel adder.

If C is connected to $C_1$ then the parallel adder 70 shown in FIG. 3 becomes a residue adder modulo $(2^n - 1)$. FIG. 4 shows how to utilize the parallel adder 70 in FIG. 3 to implement the circuit 10 shown in FIG. 1, to result in a device 80 using a single parallel adder 84.

Figure 5:
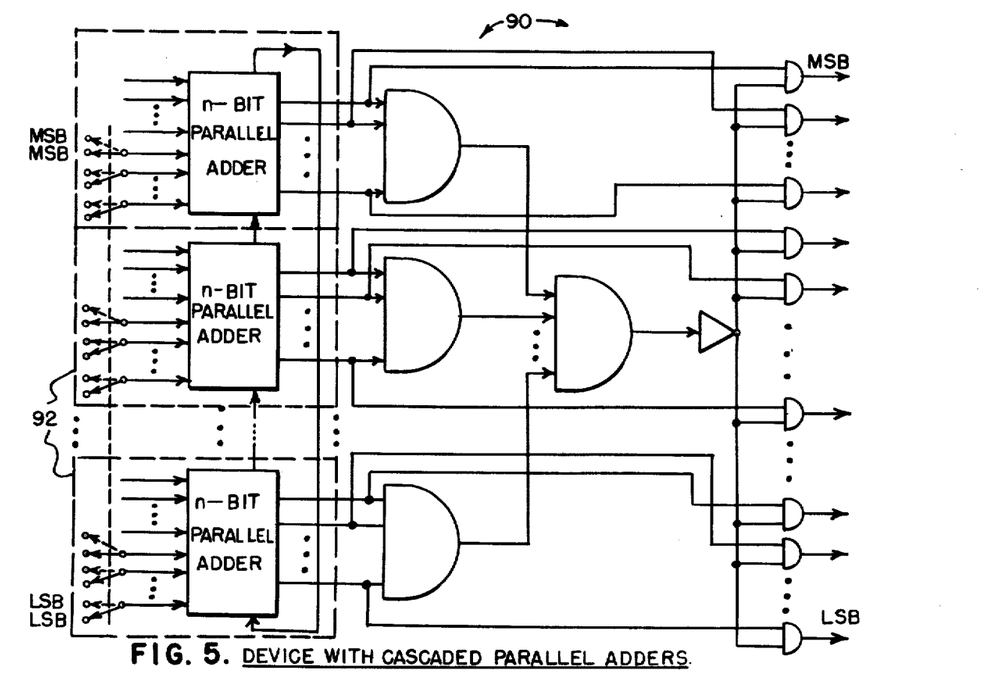
FIG. 5 is a device using cascaded parallel adders, such as the one shown in FIG. 4.

Any number of parallel adders 84, of the type shown in FIG. 4, can be cascaded, to implement the circuit in FIG. 1. FIG. 5 shows a combination 92 of cascaded parallel adders 84.

In FIG. 5 the unswitched inputs from bottom to top are the least significant bit through the most significant bit of one input, and for the switched inputs, the least significant bit through the most significant bit of the other input. The least significant bit of the output is on the bottom and most significant bit is on the top, as is shown in the figure.

Figure 6:
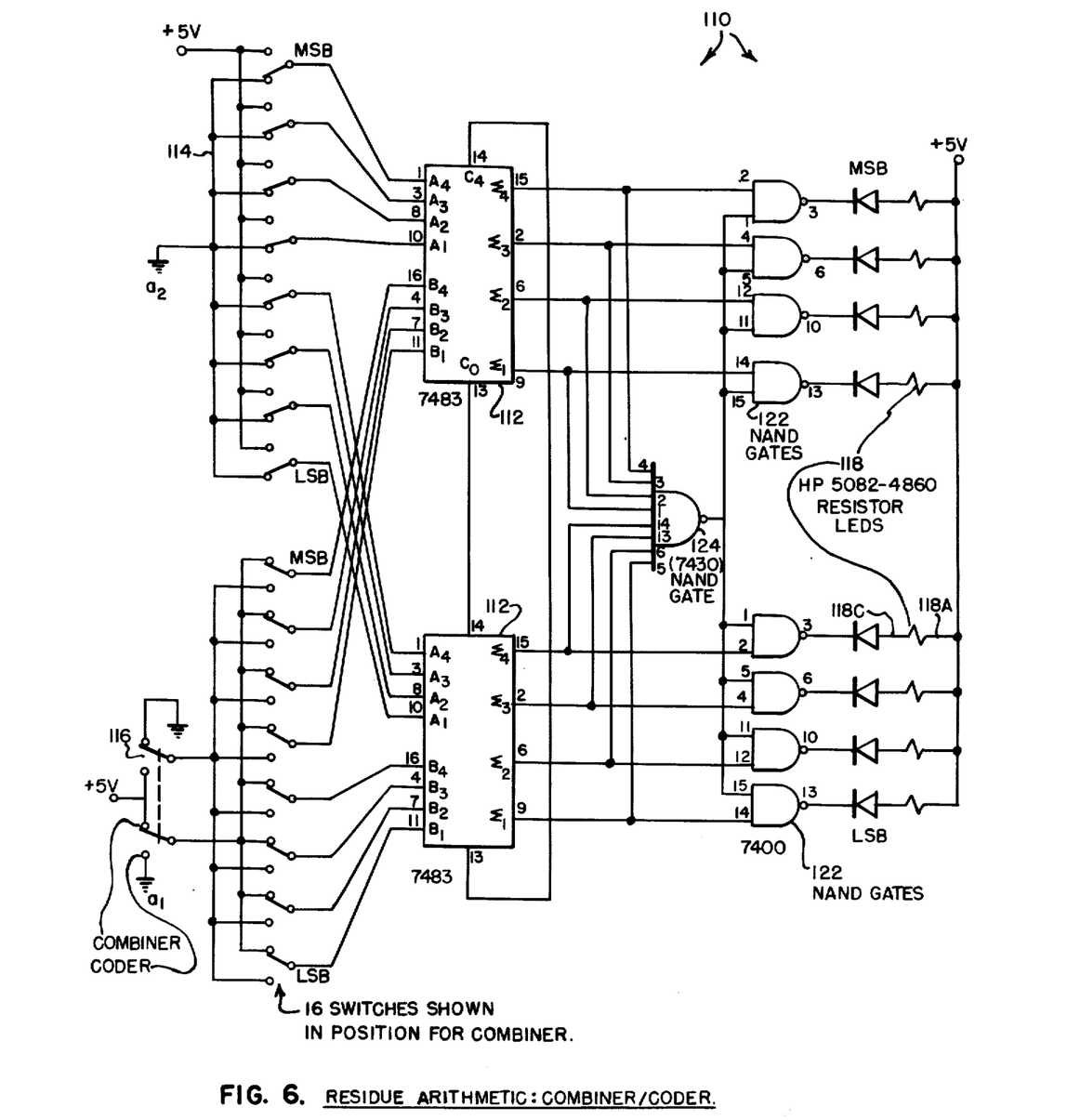
FIG. 6 is a block diagram of a combiner/coder using residue class arithmetic.

FIG. 6 shows a combiner-coder 110, which is a realization of the device 10 shown in FIG. 1, through discrete adders 112, for demonstration purposes. This circuit 110 uses switches 114 and 116, for the inputs and LED lamps 118 for the output display. The logic is made out of standard transistor-transistor logic (TTL). CMOS could be directly substituted for low speed (1 MHz), low output drive and using 74C series (manufactured by NATIONAL SEMI-CONDUCTOR). As is shown in FIg. 6, input $a_1$ is inverted (for combining) or not inverted (for coding) via the DPDT switch 116, which reverses the polarity of the voltages going to the $a_1$ switches. This proved to be a convenient way to give controlled inversion of $a_1$ of this demonstration model.

An eight-bit model was built. It will also work for less than eight bits if the upper unused switches 114 are in the "down" position for combining or in the "up" position for coding.

The output requires proper interpreting. For combining, $a_1$ represents the n least significant bits (LSBs) while the indicator lamps, light-emitting diodes (LEDs) 118, represent the n most significant bits. For coding, the LEDs 118 give the answer directly. In general, AND gates would be used on the output. NAND gates 122 were used in this model since the LEDs invert the logic. To light an LED 118, a logic zero is applied to the cathode side 118C while the anode side 118A is wired to +5 volts.

The eight-input NAND gate (7430), 124, detects when an all "ones" condition exists on the adder 118 outputs. The NAND gate 124 then applies a zero to the NAND GATES 122 in series with the adder 112 outputs, which results in turning all LEDs 118 off, giving an "all zeros" display.

Figure 7:
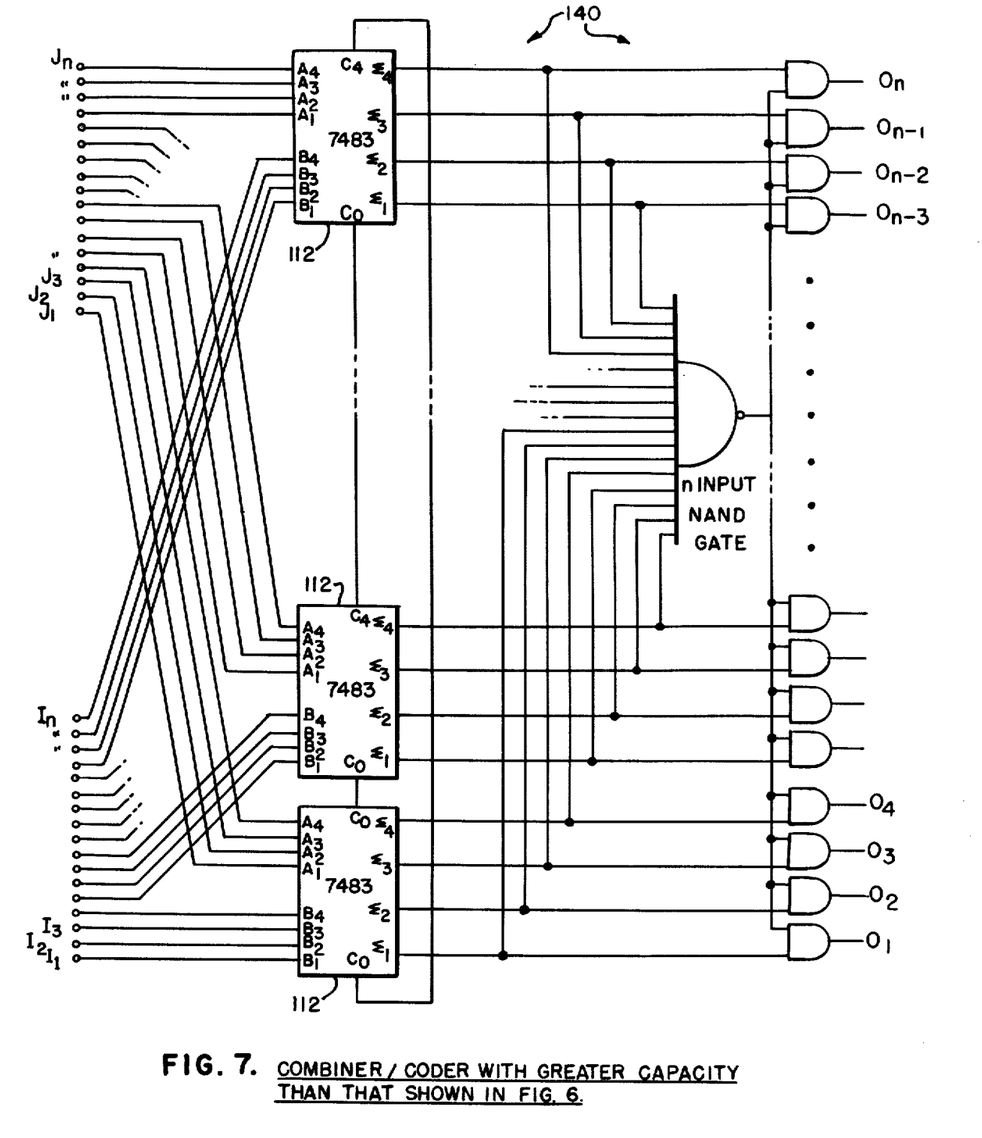
FIG. 7 is a block diagram similar to that shown in FIG. 6 except capable of handling modulo numbers greater than that shown in FIG. 6.

FIG. 7 shows how this circuit, 110 of FIG. 6, can be expanded to result in a residue arithmetic combiner-coder 140 where n is larger than 8. FIG. 7 is a slight variation of FIG. 4, showing more detailed pin connections to the four-bit 112 adder building block. It will be noted that the two binary voltage levels are +5 V and 0 V, or ground.

As an alternative construction, any available adder component accepting two-word inputs and a carry input and outputting one word and a carry can be used to implement the circuit in FIG. 1.

In summary, the invention allows the construction of a single component which can be used with available digital components to provide a double precision mode of operation. The single component can be used for the necessary coding and final decoding or combining. It can also be used for modulo ($2^n-1$) addition and subtraction.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for the modulo number calculation of input signals in binary form, using residue class arithmetic, comprising:

a plurality n of three-input, two-output, adding means, having one input for receiving a signal $K_0$, $K_1, \ldots, K_{n-1}$, where $K_i = a \bmod (2^n-1)$, a second input for receiving a signal, $J_0, J_1, \ldots, J_{n-1}$, where $J_i = b \pmod{2^n-1}$, the third input, for receiving an input carry, being circularly connected to one of the outputs, a first output, of an adjacent adding means, for transmitting an output carry to it, the first output of the 0-th adding means being connected to the third input of the 1st adding means, the 1st to the 2nd, etc., through the (n−1)st to the 0-th;

an n-input means for adding, whose inputs comprise, and are connected to, the second outputs of the n three-input adding means, for adding the n inputs in an AND manner;

an inverting means, whose input is connected to the output of the n-input adding means, for inverting the signal at its input; and a plurality of n two-input ANDing means, each having one of its inputs connected to the output of one of the n adding means, the other input being connected to the output of the inverting means, the output signal comprising the sum $K_i + J_i = (a+b)$ modulo ($2^n-1$) of two input signals, $K_i = a$ modulo ($2^n-1$) and $J_i = b$ modulo ($2^n-1$), whereby the apparatus serves as an adder.

2. The apparatus according to claim 1, further comprising:

a plurality of n switching means, connected to binary input signals $I_0, I_1, \ldots, I_{n-1}$, for switching the I signal alternately to one of a pair of connecting points, a first or a second connecting point; and a plurality of n inverting means, connected to the n first connecting points, for inverting the polarity of the I signals received at their inputs, the outputs of the inverting means being connected to the other connecting points of the pair, at which connection the I signal is identical to the K signal, and the apparatus remains an adder, $J_i + K_i = J_i + I_i$, whereas the apparatus is a subtracter, $J_i - I_i$, when the I signal is inverted.

3. The apparatus according to claim 2 wherein:
the n-input means for adding are full adders.

* * * * *